(12) United States Patent
Chen et al.

(10) Patent No.: US 8,237,904 B2
(45) Date of Patent: Aug. 7, 2012

(54) DISPLAY PANEL WITH DRIVING CIRCUIT AND COMMON ELECTRODE WITHIN SEALANT

(75) Inventors: Maw-Song Chen, Taipei (TW); Kuo-Yu Huang, Hsinchu County (TW); Te-Chun Huang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/337,160

(22) Filed: Dec. 26, 2011

(65) Prior Publication Data
US 2012/0092578 A1 Apr. 19, 2012

Related U.S. Application Data

(62) Division of application No. 12/369,757, filed on Feb. 12, 2009, now Pat. No. 8,120,742.

(30) Foreign Application Priority Data

Aug. 25, 2008 (TW) ................................ 97132431 A

(51) Int. Cl.
*G02F 1/1345* (2006.01)
*G09G 3/36* (2006.01)
*H01L 29/04* (2006.01)
(52) U.S. Cl. .............. 349/151; 349/42; 349/43; 349/44; 349/152; 345/92; 345/104; 257/59; 257/72
(58) Field of Classification Search .............. 349/42–44, 349/151–152; 345/92, 104; 257/99, 72
See application file for complete search history.

(56) References Cited

U.S. PATENT DOCUMENTS

| | | | | |
|---|---|---|---|---|
| 6,288,764 | B1* | 9/2001 | Zhang et al. ................. | 349/152 |
| 7,492,417 | B2* | 2/2009 | Hirakata et al. .............. | 349/33 |
| 7,714,974 | B2* | 5/2010 | Lee et al. ..................... | 349/153 |
| 2002/0109815 | A1 | 8/2002 | Hirakata et al. | |

FOREIGN PATENT DOCUMENTS

| | | |
|---|---|---|
| TW | 200406636 | 5/2004 |
| TW | 200419523 | 10/2004 |

OTHER PUBLICATIONS

"Office Action of Taiwan Counterpart Application", issued on Feb. 1, 2012, p. 1-p. 8, in which the listed references were cited.

* cited by examiner

*Primary Examiner* — Hoan C Nguyen
(74) *Attorney, Agent, or Firm* — Jianq Chyun IP Office

(57) ABSTRACT

A driving circuit and a common electrode are located within a sealant region of the first substrate, wherein the driving circuit includes switch devices and turn-line structures. The common electrode is located within the sealant region of the first substrate. The planar layer is located on the first substrate, wherein the thickness of the planar layer at the turn-line structure of the driving circuit is less than the thicknesses of other portions. The conductive layer is located on the planar layer. A second substrate having an electrode thereon is disposed opposite to the first substrate. A liquid crystal layer is located within the display region between the first substrate and the second substrate. A sealant is located within the sealant region between the first substrate and the second substrate, and conductive balls are distributed in the sealant.

8 Claims, 9 Drawing Sheets

DISPLAY PANEL WITH DRIVING CIRCUIT AND COMMON ELECTRODE WITHIN SEALANT

CROSS-REFERENCE TO RELATED APPLICATION

This application is a divisional application of and claims priority benefit of a patent application Ser. No. 12/369,757, filed on Feb. 12, 2009, now in condition of allowance. The prior U.S. application claims the priority benefit of Taiwan application serial no. 97132431, filed on Aug. 25, 2008. The entirety of the above-mentioned patent applications is hereby incorporated by reference herein and made a part of specification.

BACKGROUND OF THE INVENTION

1. Field of the Invention

The present invention generally relates to a display panel and a manufacturing method thereof, and more particularly, to a display panel where the thickness of the planar layer at the turn-line structure is less than the thicknesses of the other portions and a manufacturing method thereof.

2. Description of Related Art

Along with the increasing progress of science and technology, people's life gets more convenient by means of displays. With the overwhelming advantage of light and thin design feature, a flat panel display (FPL) today has largely taken over the traditional cold cathode fluorescent lamp display (CCFL display) and dominated the present display market, wherein a liquid crystal display (LCD) is the most favourable by people.

While the panel industry is flourishing today, all the manufacturers do the best to promote the technology level of their own so as to break through a more critical bottle neck to fabricate a panel with lighter and thinner feature. In order to achieve a larger display region within a panel, the packaged integrated circuit devices employed by a panel must be fabricated to have smaller size with the same functions in addition to reduce the number of the employed packaged integrated circuit devices. Besides, reducing the width of the border region of a display panel is also a solution to make the panel lighter and thinner and have a larger display region. To achieve the above-mentioned objectives, a novel design and manufacturing method is required, wherein the novel architecture is able to compromise the integrity of the driving circuit with reducing the width of the border region.

SUMMARY OF THE INVENTION

Accordingly, the present invention is directed to a display panel where the driving circuit thereof is disposed within a sealant region to reduce the width of the border region thereof.

The present invention is also directed to a display panel where the driving circuit is formed on the pixel array substrate thereof to reduce the width of the border region thereof without increasing the process complexity.

The present invention is further directed to a manufacturing method of a display panel which is able to make the driving circuit disposed within the above-mentioned sealant region to reduce the width of the border region without increasing the process complexity.

The present invention provides a display panel having a display region and a sealant region. The display panel includes a first substrate, a pixel array, a driving circuit, a common electrode, a planar layer, a conductive layer, a second substrate, an electrode layer, a liquid crystal layer, a sealant and a plurality of conductive balls. The pixel array is located within the display region on the first substrate. The driving circuit is located within the sealant region of the first substrate, wherein the driving circuit includes a plurality of switch devices and a plurality of turn-line structures. The common electrode is located within the sealant region of the first substrate. The planar layer is located on the first substrate and covers the pixel array, the driving circuit and the common electrode, wherein the thickness of the planar layer at the turn-line structure of the driving circuit is less than the thicknesses of other portions and there is a contact hole in the planar layer to expose the common electrode. The conductive layer is located on the planar layer and electrically connected to the common electrode via the contact hole. The second substrate is located oppositely to the first substrate. The electrode layer is located on the second substrate. The liquid crystal layer is located between the first substrate and the second substrate. The sealant is located within the sealant region between the first substrate and the second substrate. The conductive balls are distributed in the sealant, wherein the conductive layer on the first substrate is electrically connected to the electrode layer on the second substrate though the conductive balls.

In an embodiment of the present invention, the thickness of the planar layer at the turn-line structure of the driving circuit is less than the thicknesses of other portions by roughly over 0.3 μm.

In an embodiment of the present invention, the turn-line structure of the driving circuit includes a first conductive layer, a second conductive layer, a first insulating layer, a second insulating layer, a planar layer and a third conductive layer. The first insulating layer is located between the first conductive layer and the second conductive layer. The second insulating layer is located on the second conductive layer. The planar layer is located on the second insulating layer, wherein the planar layer, the first insulating layer and the second insulating layer have a first contact hole and a second contact hole therein, and the first contact hole and the second contact hole respectively expose the first conductive layer and the second conductive layer. The third conductive layer is located on the planar layer, and the first contact hole and the second contact hole are filled with the third conductive layer to make the first conductive layer and the second conductive layer electrically connected to each other.

In an embodiment of the present invention, the third conductive layer and the conductive layer are made of the same material.

In an embodiment of the present invention, the switch device of the driving circuit includes a thin film transistor (TFT).

In an embodiment of the present invention, the material of the planar layer includes an organic photosensitive material.

In an embodiment of the present invention, the display panel further includes a light-shielding pattern layer and a color filter array, both which are located between the second substrate and the electrode layer.

In an embodiment of the present invention, the conductive balls include gold balls.

The present invention provides a manufacturing method of display panel. The method includes, first, providing a first substrate having a display region and a sealant region. Next, a pixel array is formed within the display region of the first substrate, and at the same time, a driving circuit and a common electrode are formed within the sealant region of the first substrate, wherein the driving circuit includes a plurality of switch devices and a plurality of turn-line structures. Next, a planar layer is formed on the first substrate to cover the pixel array, the driving circuit and the common electrode. Next, the planar layer is patterned to form a contact hole in the planar layer and to make the thickness of the planar layer at the turn-line structure of the driving circuit less than the thicknesses of other portions. Next, a conductive layer is formed on the planar layer, wherein the contact hole is filled with the conductive layer so that the conductive layer is electrically connected to the common electrode. A sealant is formed within the sealant region, wherein a plurality of conductive balls is distributed in the sealant. Next, a second substrate is provided and an electrode layer is formed on the second substrate. Finally, the first substrate is assembled with the second substrate together and a liquid crystal layer is injected into the display region, wherein the conductive layer on the first substrate is electrically connected to the electrode layer of the second substrate through the conductive balls.

In an embodiment of the present invention, the step of patterning the planar layer includes conducting an exposing process by using a gray-tone, a half-tone or two photomask.

In an embodiment of the present invention, the thickness of the planar layer at the turn-line structure of the driving circuit is less than the thicknesses of other portions by roughly over 0.3 µm.

In an embodiment of the present invention, the step of forming the turn-line structure of the driving circuit includes forming a first conductive layer on the first substrate, forming a first insulating layer on the first conductive layer, forming a second conductive layer on the first insulating layer, forming a second insulating layer on the second conductive layer and forming a planar layer on the second insulating layer. Then, the planar layer, the first insulating layer and the second insulating layer are patterned to form a first contact hole and a second contact hole, wherein the first contact hole and the second contact hole respectively expose the first conductive layer and the second conductive layer. Finally, a third conductive layer is formed on the planar layer and the first contact hole and the second contact hole are filled with the third conductive layer to make the first conductive layer and the second conductive layer electrically connected to each other.

In an embodiment of the present invention, the third conductive layer and the conductive layer are simultaneously formed.

In an embodiment of the present invention, the third conductive layer and the conductive layer are transparent conductive layers.

In an embodiment of the present invention, the material of the planar layer includes an organic photosensitive material. After the exposing process is conducted, the planar layer has different thickness and exposes the insulating layer that will be removed later.

In an embodiment of the present invention, the step of removing the insulating layer in the first contact hole, the second contact hole and the contact hole on the common electrode are conducted simultaneously.

In an embodiment of the present invention, the manufacturing method also includes forming a light-shielding pattern layer and a color filter array on the second substrate prior to forming the electrode layer on the second substrate.

In an embodiment of the present invention, the conductive balls distributed in the sealant include gold balls.

Since, in the present invention, the thickness of the planar layer at the turn-line structure of the driving circuit is less than the thicknesses of other portions, therefore, a fault electrical conducting of the driving circuit due to the connect by gold balls between the driving circuits and the electrode layer on the second substrate can be avoided, which further prevents the display from producing defects. As a result, the driving circuit can be integrated onto the pixel substrate and disposed within the sealant region. In this way, the width of the border region is reduced and the area of the display region is expanded.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
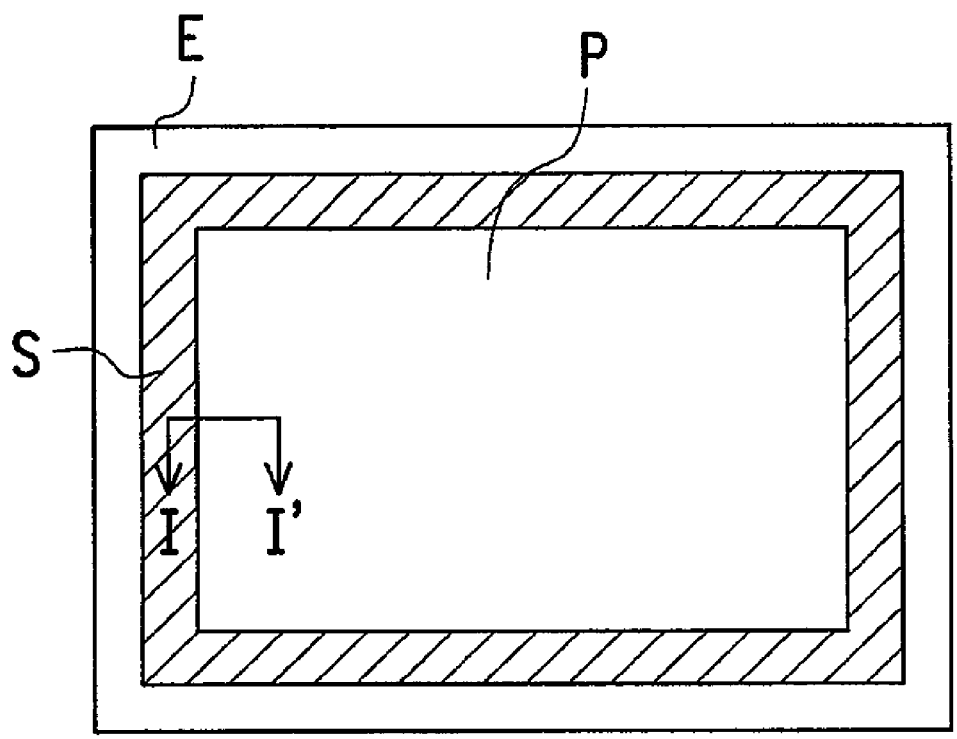
FIG. 1A is a top view diagram of a display panel according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
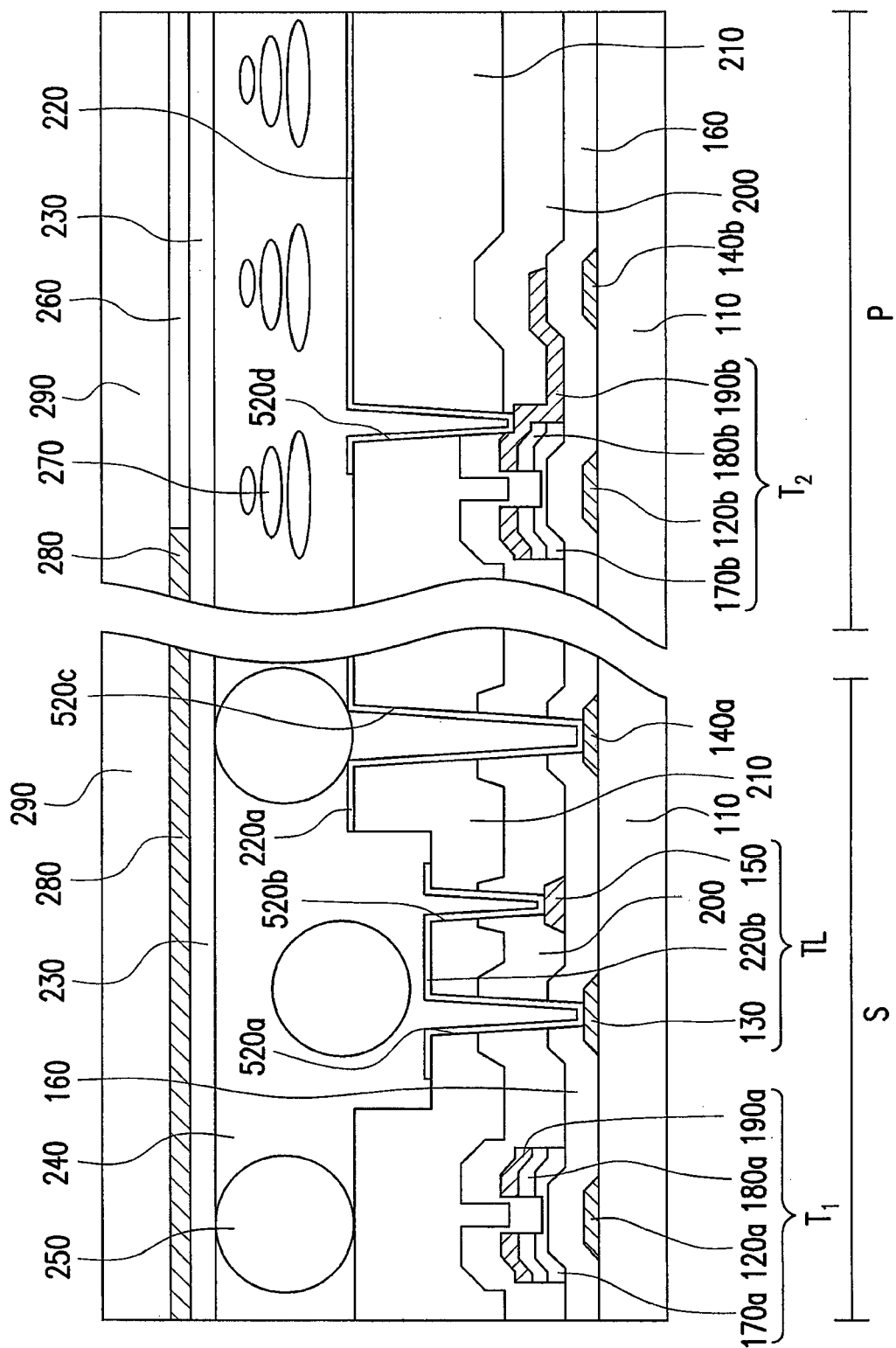
FIG. 1B is a sectional structure diagram of a display panel according to an embodiment of the present invention.

FIG. 1A is a top view diagram of a display panel according to an embodiment of the present invention and FIG. 1B is a sectional structure diagram of a display panel according to an embodiment of the present invention, wherein FIG. 1B is the sectional diagram of FIG. 1A along line I-I'. Referring to FIGS. 1A and 1B, a display panel contains a display region P, a sealant region S and a border region E which contains all region except a display region P, and FIG. 1B is the localized sectional diagram of the sealant region S and the display region P.

The structure of the sealant region S is described in details as follows. Within the sealant region S, a driving circuit (including switch devices T1 and turn-line structures TL), a common electrode 140a, a planar layer 210 and a conductive layer 220a are disposed on a first substrate 110, wherein the switch devices T1, the turn-line structures TL and the common electrode 140a are disposed on the first substrate 110. The planar layer 210 covers the switch devices T1, the turn-line structures TL and the common electrode 140a, wherein the thickness of the planar layer 210 at the turn-line structures TL of the driving circuit is less than the thicknesses of the planar layer under the conductive layer 220a, and the material of the planar layer 210 is, for example, an organic photosensitive material. The conductive layer 220a is located on the planar layer 210 and electrically connected to the common electrode 140a.

In more detail, the switch devices T1 are TFTs and each of the switch devices T1 includes a gate 120a, a channel layer 170a, an ohmic contact layer 180a and a source/drain 190a. The gate 120a is covered by a first insulating layer 160 and the source/drain 190a is covered by a second insulating layer 200.

Each of the turn-line structures TL includes a first metal layer 130, the first insulating layer 160, a second metal layer 150, the second insulating layer 200, the planar layer 210 and a conductive layer 220b. The first metal layer 130 is located on the first substrate 110, the first insulating layer 160 covers the first metal layer 130, the second metal layer 150 is located on the first insulating layer 160, the second insulating layer 200 covers the second metal layer 150 and the planar layer 210 covers the second insulating layer 200. In particular, two contact holes 520a and 520b are formed in the planar layer 210 the first insulating layer 160 and the second insulating layer 200, and respectively expose a part of the first metal layer 130 and a part of the second metal layer 150. Besides, the conductive layer 220b is located on the planar layer 210 and the contact holes 520a and 520b are filled with the conductive layer 220b so that the first metal layer 130 is electrically connected to the second metal layer 150. In more detail, at the turn-line structure TL, the first metal layer 130 and the second metal layer 150 are electrically connected to each other through the conductive layer 220b and the contact holes 520a and 520b.

The common electrode 140a is located on the first substrate 110 and covered by the first insulating layer 160, the second insulating layer 200 and the planar layer 210. A contact hole 520c is formed in the first insulating layer 160, the second insulating layer 200 and the planar layer 210 to expose a part of the common electrode 140a. The conductive layer 220a is located on the planar layer 210 and the contact hole 520c is filled with the conductive layer 220a, wherein the conductive layer 220a is electrically connected to the common electrode 140a.

Within the sealant region S, moreover, a light-shielding pattern layer 280 and an electrode layer 230 are disposed on a second substrate 290. In addition, a sealant 240 is disposed between the first substrate 110 and the second substrate 290, wherein a plurality of conductive balls 250, for example gold balls, is distributed in the sealant 240. By disposing the conductive balls 250 in the sealant 240, the common electrode 140a on the first substrate 110 is able to electrically connect the electrode layer 230 on the second substrate 290 through the contact hole 520c, the conductive layer 220a and the conductive balls 250.

In the present invention, the common electrode 140a on the first substrate 110 is electrically connected to the electrode layer 230 on the second substrate 290 through the conductive layer 220a and the conductive balls 250. To avoid the turn-line structures TL from fault electrical connecting the electrode layer 230 on the second substrate 290 due to the possible contacts of the conductive balls 250, the present invention has a special design on the planar layer 210 on the first substrate 110; that is, the thickness of the planar layer 210 at the turn-line structure TL of the driving circuit is made to be less than the thicknesses of the planar layer under the conductive layer 220a. In the embodiment, the thickness of the planar layer 210 at the turn-line structure TL is less than the thicknesses of the planar layer under the conductive layer 220a by roughly over 0.3 μm. Since the thickness of the planar layer 210 at the turn-line structure TL is less than the thicknesses of the planar layer under the conductive layer 220a, therefore, the thickness of the sealant 240 at the turn-line structure TL is thicker, which effectively avoid a fault electrical conducting between the turn-line structure TL and the electrode layer 230 due to the possible contacts of the conductive balls 250.

The structure of the display panel within the display region P is described as follows. A pixel array is disposed on the first substrate 110 within the display region P, wherein each pixel includes a switch device T2 and a pixel electrode 220. In the embodiment, each pixel further includes a common electrode 140b and the common electrode 140b is electrically connected to the common electrode 140a within the sealant region S. In more detail, the switch devices T2 is, for example, a TFT which includes a gate 120b, a channel layer 170b, an ohmic contact layer 180b and a source/drain 190b. The first insulating layer 160 covers the gate 120b, the second insulating layer 200 covers the source/drain 190b and the planar layer 210 covers the second insulating layer 200. The common electrode 140b and the source/drain 190b over the common electrode 140b together form a storage capacitor. In addition, a contact hole 520d is formed in the planar layer 210 and the second insulating layer 200 to expose a part of the source/drain 190b. The pixel electrode 220 is located on the planar layer 210 and the contact hole 520d is filled with the pixel electrode 220 so that the pixel electrode 220 is electrically connected to the source/drain 190b of the switch device T2.

A light-shielding pattern layer 280, a color filter array 260 and an electrode layer 230 are disposed on the second substrate 290 within the display region P. A plurality of unit areas is defined by the light-shielding pattern layer 280 on the second substrate 290, and the color filter array 260 is disposed within the unit areas. The electrode layer 230 covers the light-shielding pattern layer 280 and the color filter array 260.

A liquid crystal layer 270 is disposed between the first substrate 110 and the second substrate 290 within the display region P by injecting the liquid crystal layer 270 therebetween.

The manufacturing method of the above-mentioned display panel is depicted as follows.

Figure 2A:
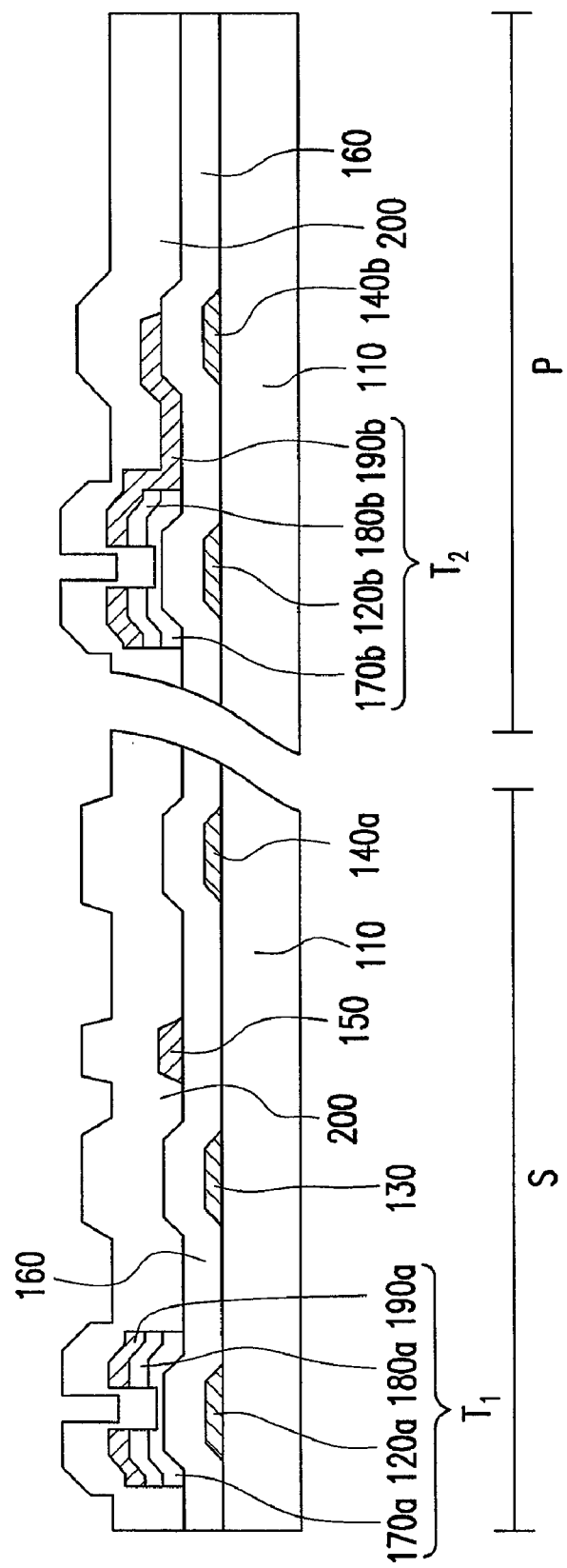
FIGS. 2A-2G are sectional diagrams of a display panel illustrating the manufacturing flow of the display panel according to an embodiment of the present invention.
Figure 2B:
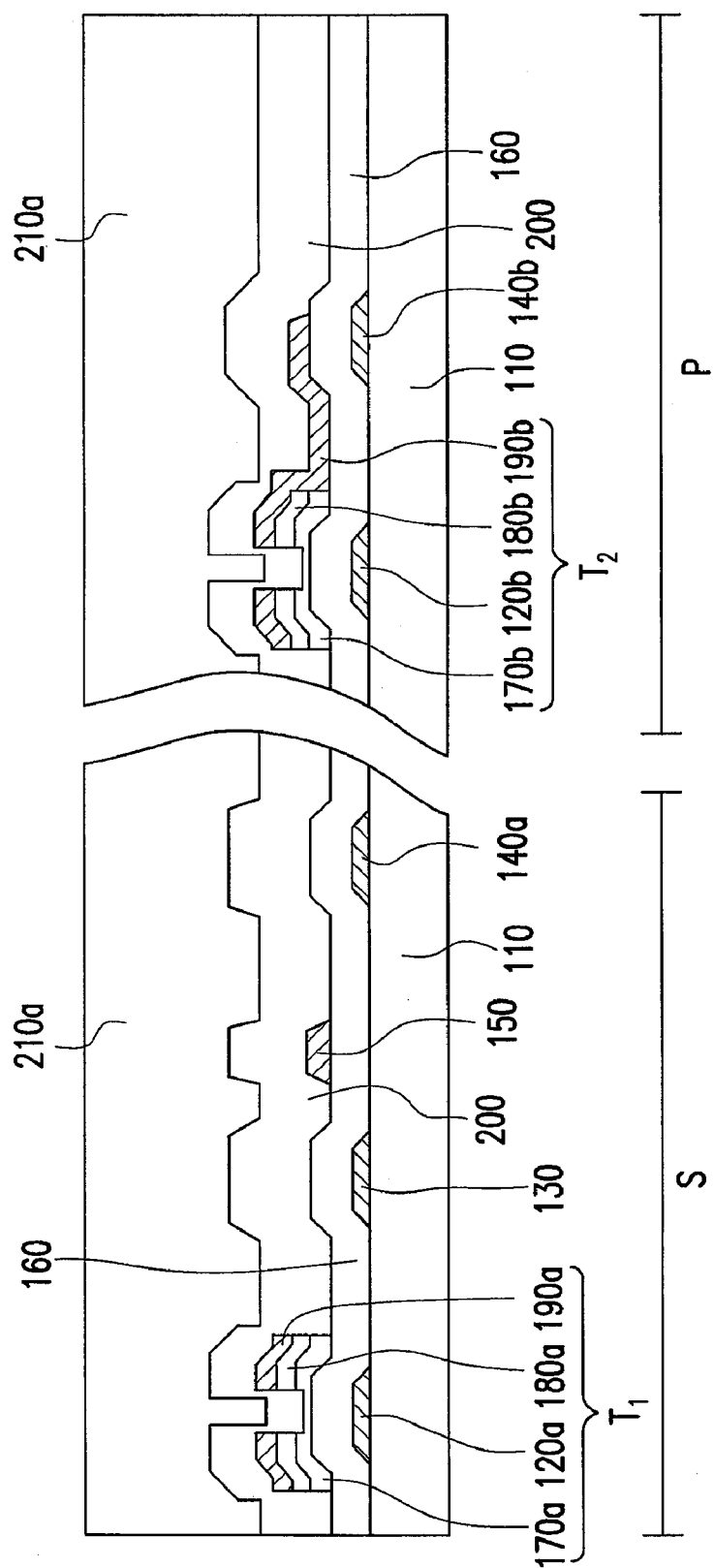

FIGS. 2A-2G are sectional diagrams of a display panel illustrating the manufacturing flow of the display panel according to an embodiment of the present invention. Referring to FIG. 2A first, a first substrate 110 is provided, wherein the first substrate 110 has a display region P and a sealant region S. Next, a switch device T2 is formed on the first substrate 110 within the display region P, and a switch device T1, a common electrode 140a, a first metal layer 130 and a second metal layer 150 are formed on the first substrate 110 within the sealant region S. In the embodiment, another common electrode 140b is formed within the display region P.

In the embodiment, the switch devices T2 and T1 are simultaneously fabricated by using, for example but not limited by the present invention, the conventional processes of depositing, coating, exposing, developing and etching. The components of the switch devices T2 and T1 are described as above-mentioned, and hence the components are omitted to describe herein. Note that during forming the gate 120b of the switch device T2 and the gate 120a of the switch device T1, a first metal layer 130, a common electrode 140a and a common electrode 140b are simultaneously formed; during forming the source/drain 190b of the switch device T2 and the source/drain 190a of the switch device T1, a second metal layer 150 is simultaneously formed.

Then, an insulating layer 200 covering the switch devices T2 and T1 is formed. Thereafter, referring to FIG. 2B, a planar layer 210a is formed within the sealant region S and the display region P, wherein the material of the planar layer 210a is, for example, an organic photosensitive material.

Figure 2C:
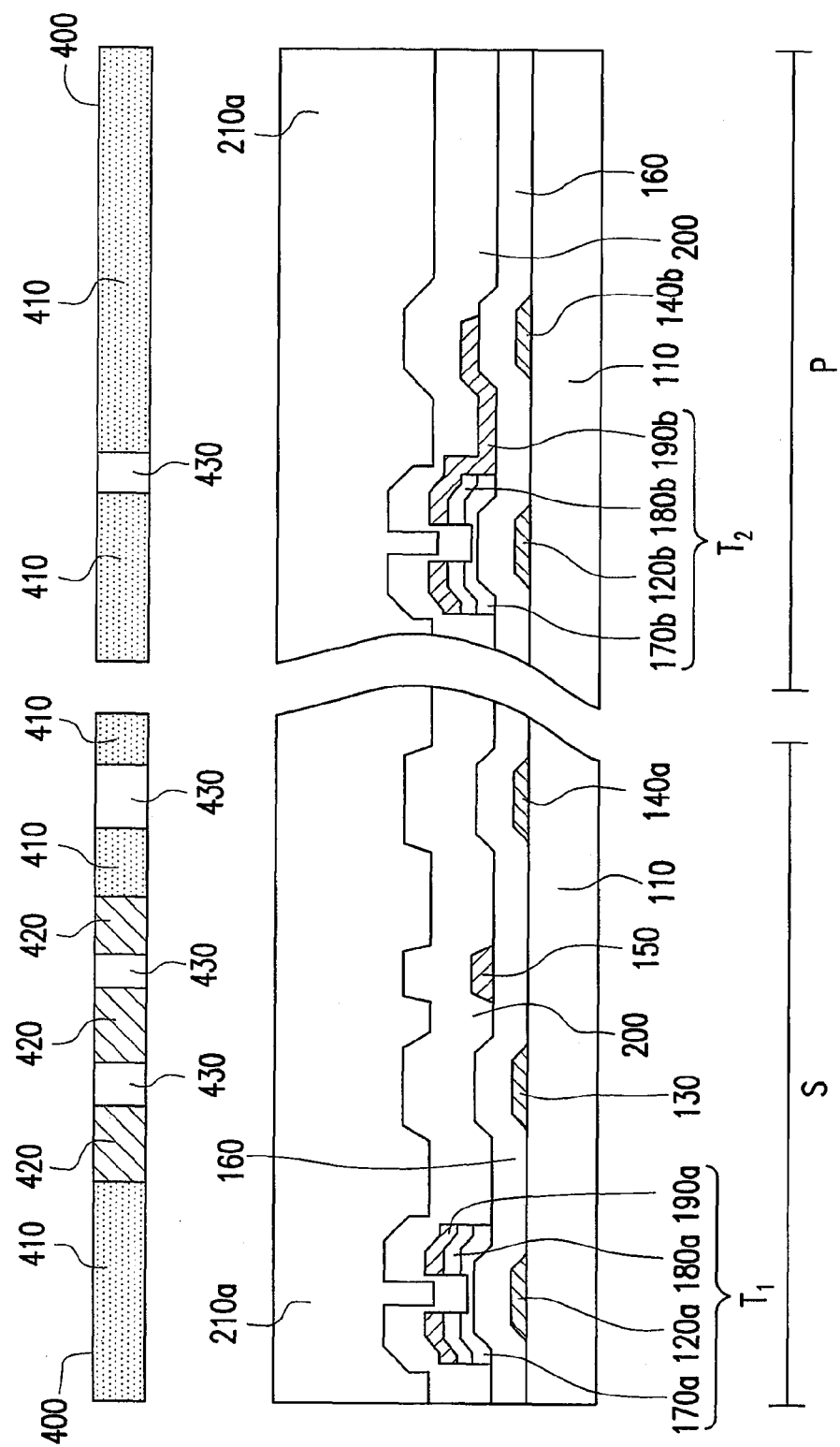

Next referring to FIG. 2C, a photomask 400 is disposed over the planar layer 210a and the photomask 400 is, for example, a gray-tone photomask or a half-tone photomask and has an opaque region 410, a translucent region 420 and a transparent region 430. In particular, the translucent region 420 is disposed over the TL region and the transparent region 430 is correspondingly disposed. over the first metal layer 130 and the second metal layer 150.

Figure 2D:
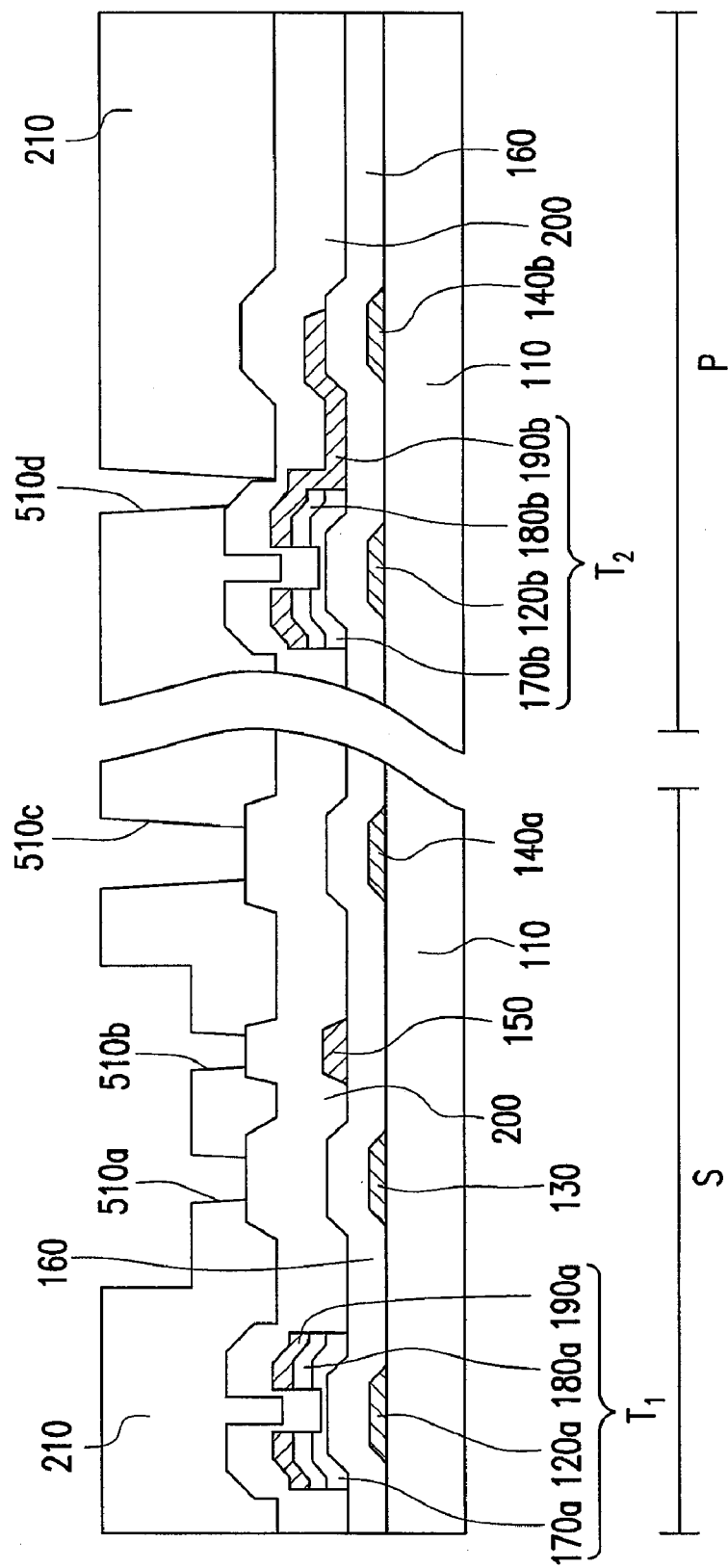

Next, an exposing process is conducted on the planar layer 210a by using the photomask 400, followed by conducting a developing process to form a patterned planar layer 210 as shown in FIG. 2D. In more detail, the part of the patterned planar layer 210 corresponding to the opaque region 410 of the photomask 400 keeps the original thickness, as shown by FIG. 2D. However, the part of the patterned planar layer 210 corresponding to the translucent region 420 of the photomask 400 has a thinner thickness. In the embodiment, the thickness of the part of the planar layer 210 corresponding to the translucent region 420 of the photomask 400 is less than the thicknesses of the planar layer under the conductive layer 220a by roughly over 0.3 μm. A plurality of openings 510a, 510b, 510c and 510d is formed in the part of the planar layer 210 corresponding to the transparent region 430 of the photomask 400. Alternatively, two different photomasks and two different exposing energy can also be used to get different thicknesses of the planar layer.

Figure 2E:
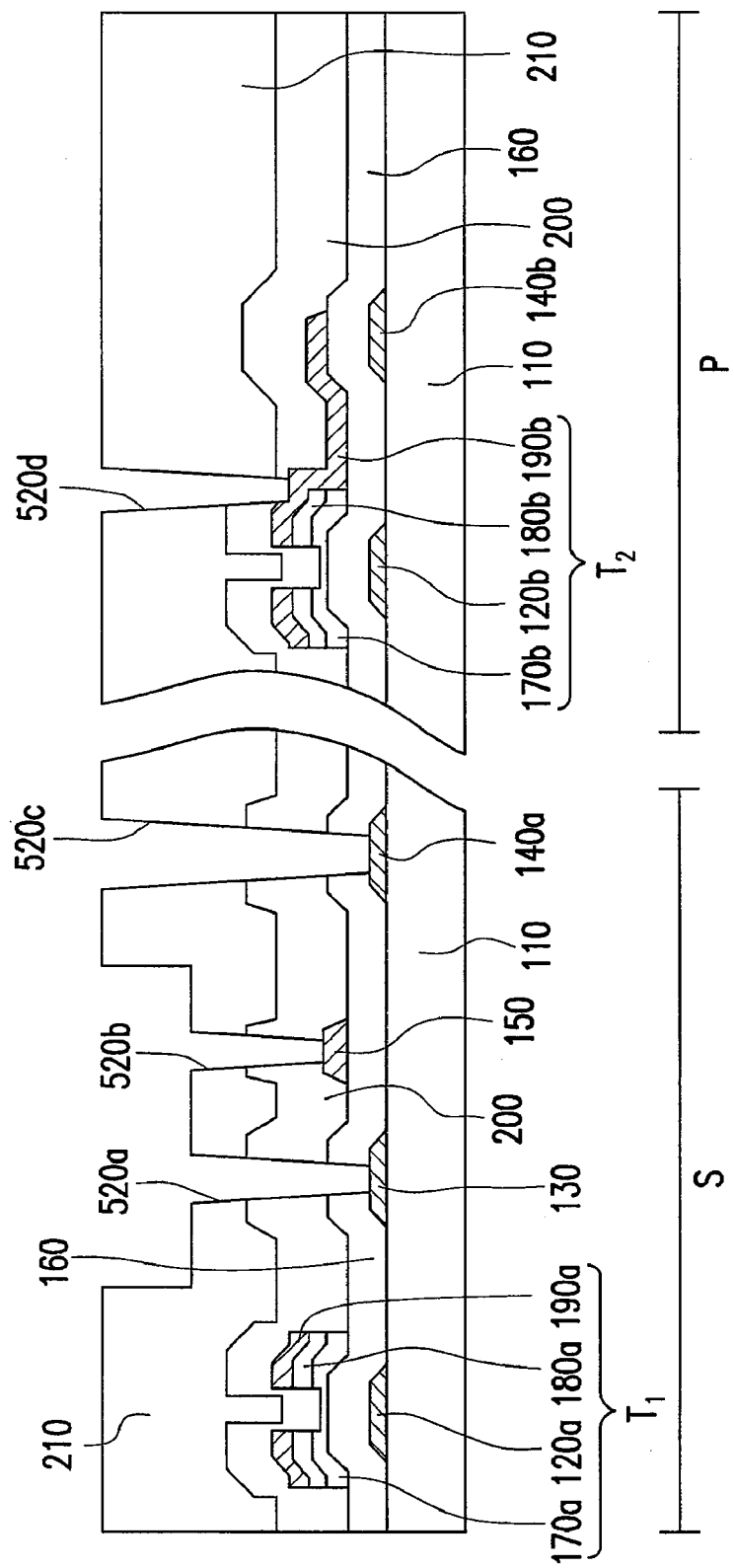

Next referring to FIG. 2E, the planar layer 210 is served as an etching photomask to conduct an etching process to form a plurality of contact holes 520a, 520b, 520c and 520d. In particular, the contact hole 520a goes through the planar layer 210, the insulating layer 200 and the first insulating layer 160 to expose the first metal layer 130 of the turn-line structure. The contact hole 520b goes through the planar layer 210 and the insulating layer 200 to expose a part of the second metal layer 150 of the turn-line structure. The contact hole 520c goes through the planar layer 210, the insulating layer 200 and the first insulating layer 160 to expose a part of the common electrode 140a. The contact hole 520d goes through the planar layer 210 and the insulating layer 200 to expose a part of the source/drain 190b of the switch device T2. Besides, in addition to pattern the planar layer 210 and then etch the insulating layer 200 and the first insulating layer 160 to form the contact holes 520a, 520b, 520c and 520d, the manufacturing method of the present invention can include additional process, for example, a photo process of semiconductor. In more detail, an etching process on the insulating layer 200 and the first insulating layer 160 is conducted to form patterned insulating layers 220 and 160, then the planar layer is formed on the patterned insulating layers 220 and 160 and finally an exposing process and a developing process are conducted to form the contact holes 520a, 520b, 520c and 520d.

Figure 2F:
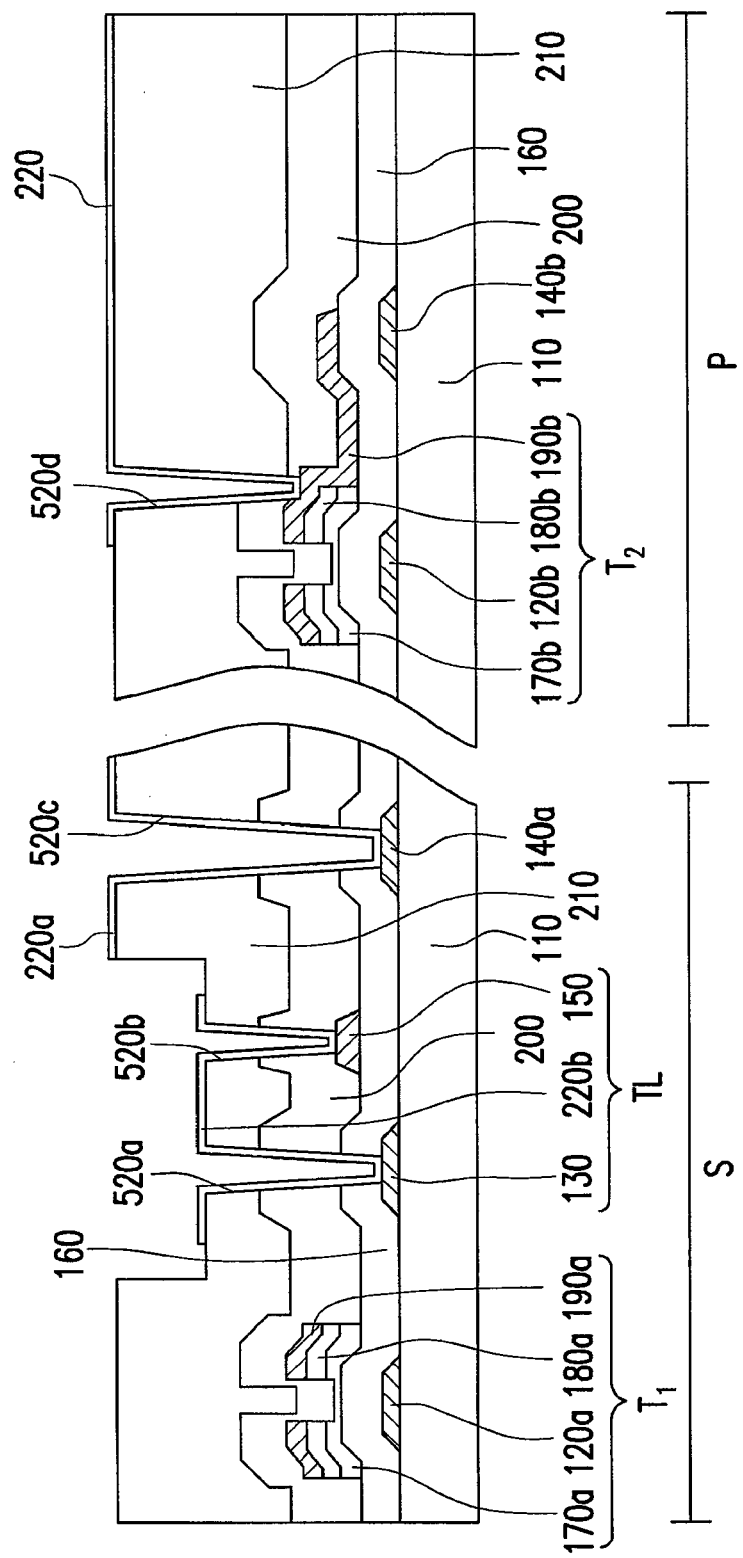

Next referring to FIG. 2F, a pixel electrode 220 is formed on the planar layer 210 within the display region P and conductive layers 220a and 220b are formed on the planar layer 210 within the sealant region S. The pixel electrode 220 is electrically connected to the source/drain 190b of the switch device T2 via the contact hole 520d. The conductive layer 220a is electrically connected to the common electrode 140a via the contact hole 520c. The conductive layer 220b is electrically connected to the first metal layer 130 and the second metal layer 150 of the turn-line structure respectively via the contact holes 520a and 520b. In this way, the first metal layer 130, the second metal layer 150 and the conductive layer 220b together form a so-called turn-line structure TL. The method of forming the pixel electrode 220 and the conductive layers 220a and 220b is, for example, to deposit a layer of transparent conductive material, followed by patterning the transparent conductive material.

Figure 2G:
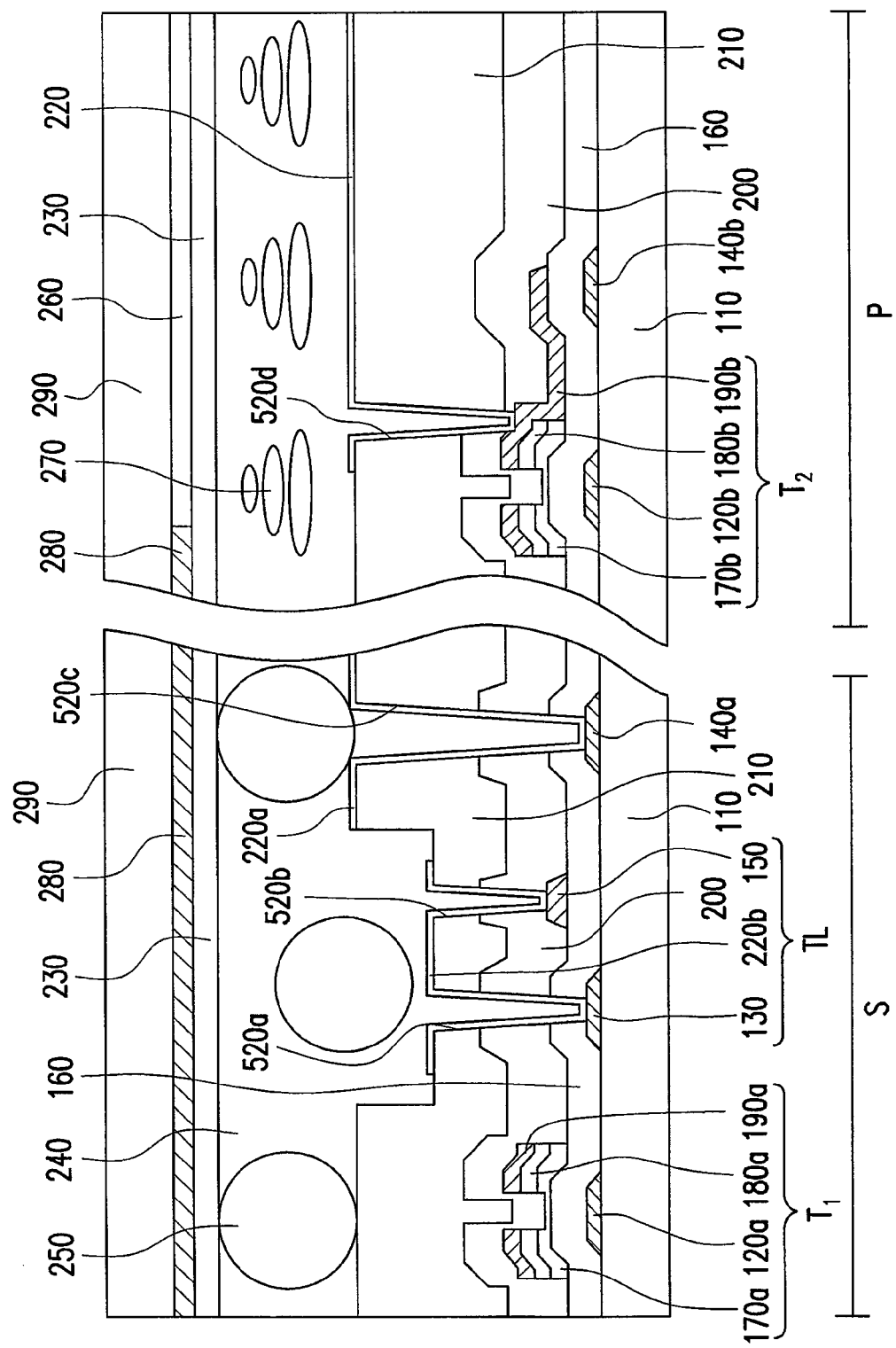

Finally referring to FIG. 2G, a second substrate 290 is provided and an electrode layer 230 is formed on the second substrate 290. In the embodiment, prior to forming the electrode layer 230, a light-shielding pattern layer 280 and a color filter array 260 are formed, wherein the material of the light-shielding pattern layer 280 is, for example, metal or black resin, and the color filter array 260 is, for example, a photoresist pattern containing red, green and blue colors or other colors.

After that, the first substrate 110 within the sealant region S is spread by the sealant 240, wherein a plurality of conductive balls 250 is distributed in the sealant 240 and the conductive balls 250 are, for example, gold balls. Then, the second substrate 290 is assembled with the first substrate 110 and a liquid crystal layer 270 is injected into the display region P, wherein the liquid crystal layer 270 can be injected into the display region P by means of vacuum capillary principle. In another embodiment, the liquid crystal layer is disposed between the two substrates by using one drop filling technique (ODF technique) for liquid crystals; that is, the first substrate 110 within the sealant region S is spread by the sealant 240, then the liquid crystals are dropped to fill the display region P and finally the second substrate 290 is assembled with the first substrate 110 together.

In the present invention, since the planar layer 210 within the sealant region S has two different thicknesses where the thickness of the planar layer at the turn-line structure TL is less than the thicknesses of the planar layer under the conductive layer 220a; therefore, after the second substrate 290 is assembled with the first substrate 110 by using the sealant 240, the common electrode 140a on the first substrate 110 is electrically connected to the electrode layer 230 on the second substrate 290 through the conductive layer 220a and the conductive balls 250. Since the planar layer 210 at the turn-line structure TL is thinner, the conductive layer 220b of the turn-line structure TL would not be wrongly conductive to the electrode layer 230 of the second substrate 290 due to possible contacting of the conductive balls 250.

The above-mentioned invented display panel can be applied to various panels according to the display modes and the designs of the film layers: transmissive display panel, transflective display panel, reflective display panel, color filter on array display panel (COA display panel), array on color filter display panel (AOC display panel), vertical alignment display panel (VA display panel), in-plane switching display panel (IPS display panel), multi-domain vertically alignment display panel (MVA display panel), twisted nematic display panel (TN display panel), super twisted nematic (STN display panel), patterned vertical alignment display panel (PVA display panel), super patterned vertical alignment display panel (S-PVA display panel), advanced super view display panel (ASV display panel), fringe field switching display panel (FFS display panel), continuous pinwheel alignment display panel (CPA display panel), axially symmetric aligned microcell display panel (ASM display panel), optically compensated bend display panel (OCB display panel), super in-plane switching display panel (S-IPS display panel), advanced super in-plane switching display panel (AS-IPS display panel), ultra fringe field switching display panel (UFFS display panel), anisotropic polymer-dispersed display panel, dual-view display panel, triple-view display panel, three-dimensional display panel (3-D display panel), touch panel, organic light emitting diode display panel (OLED display panel), low temperature poly-silicon display panel (LTPS display panel), plasma display panel (PDP), flexible display panel or display panels in other modes or a combination of the above-mentioned modes.

In summary, since the thickness of the planar layer at the turn-line structure of the driving circuit is less than the thicknesses of other portions of the planar layer; therefore, a short-circuit between the driving circuit and the electrode layer of the second substrate due to possible contacting of the conductive balls in the sealant is avoided. Further, the driving circuit can be fabricated on the pixel substrate within the sealant region without increasing the process complexity. In this way, the width of the border region is reduced and the whole panel has a larger design space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, having a display region and a sealant region, comprising:
    a first substrate;
    a pixel array, located within the display region on the first substrate;
    a driving circuit, located within the sealant region of the first substrate, wherein the driving circuit comprises a plurality of switch devices and a plurality of turn-line structures;
    a common electrode, located within the sealant region of the first substrate;
    a planar layer, located on the first substrate and covering the pixel array, the driving circuit and the common electrode, wherein the thickness of the planar layer at the turn-line structure of the driving circuit is less than the thicknesses of other portions and there is a contact hole in the planar layer to expose the common electrode;
    a conductive layer, located on the planar layer and electrically connected to the common electrode via the contact hole;
    a second substrate, located oppositely to the first substrate;
    an electrode layer, located on the second substrate;
    a liquid crystal layer, located within the display region between the first substrate and the second substrate;
    a sealant, located within the sealant region between the first substrate and the second substrate; and
    a plurality of conductive balls, distributed in the sealant, wherein the conductive layer on the first substrate is electrically connected to the electrode layer on the second substrate though the conductive balls.

2. The display panel according to claim 1, wherein the thickness of the planar layer at the turn-line structure of the driving circuit is less than the thicknesses of other portions by roughly over about 0.3 μm.

3. The display panel according to claim 1, wherein the turn-line structure of the driving circuit comprises:
    a first conductive layer;
    a second conductive layer;
    a first insulating layer, located between the first conductive layer and the second conductive layer;
    a second insulating layer, located on the second conductive layer;
    the planar layer, located on the second insulating layer, wherein the planar layer, the first insulating layer and the second insulating layer have a first contact hole and a second contact hole therein, and the first contact hole and the second contact hole respectively expose the first conductive layer and the second conductive layer; and
    a third conductive layer, located on the planar layer, wherein the first contact hole and the second contact hole are filled with the third conductive layer to make the first conductive layer and the second conductive layer electrically connected to each other.

4. The display panel according to claim 3, wherein the third conductive layer and the conductive layer are made of the same material.

5. The display panel according to claim 1, wherein the switch device of the driving circuit comprises a thin film transistor.

6. The display panel according to claim 1, wherein the material of the planar layer comprises an organic photosensitive material.

7. The display panel according to claim 1, further comprising a light-shielding pattern layer and a color filter array, both which are located between the second substrate and the electrode layer.

8. The display panel according to claim 1, wherein the conductive balls comprise gold balls.

* * * * *